Figure 1:
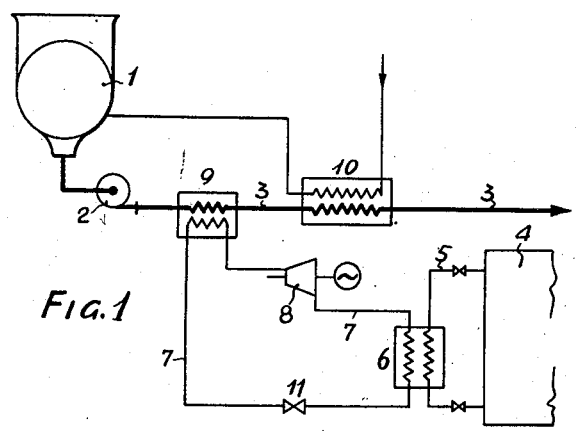

Jan. 22, 1957   R. QUINTILII LEONI   2,778,607
RECOVERY OF HEAT CONTAINED IN COOLING FLUID
OF TRANSFORMERS AND ALTERNATORS
Filed Aug. 17, 1954

INVENTOR
Renato Quintilii Leoni
BY
ATTORNEY

United States Patent Office 2,778,607
Patented Jan. 22, 1957

2,778,607

RECOVERY OF HEAT CONTAINED IN COOLING FLUID OF TRANSFORMERS AND ALTERNATORS

Renato Quintilii Leoni, Milan, Italy

Application August 17, 1954, Serial No. 450,472

6 Claims. (Cl. 257—24)

This invention relates to heat recovery systems for steam power plants and, more particularly, to a novel system for efficiently and economically recovering heat from the cooling systems of large capacity transformers used in such plants.

In steam power plants, recovered heat values are used to add heat to the condensate from the condensers, which condensate constitutes the principal portion of the boiler feed water. The heat added to the condensate is recovered from various sources such as the hydrogen used to cool the generators or alternators, the lubricating oil of forced flow lubrication systems, and the exhaust steam of the steam-jet air ejectors of the main condenser.

The steady increase in the electrical generating capacity of modern steam power plants makes recovery of heat from the cooling systems of the output transformers, and addition of this heat to the condensate, a desirable operation from the standpoint of overall efficiency. In the transformer cooling system the oil is circulated through a heat exchanger by a pump, and its heat is extracted in the exchanger by water which is also circulated by a pump. The heat thus transferred to the water is presently wasted. This is due to the fact that the effective temperature differential of such cooling water is so small that, if the water were circulated through a second heat exchanger to transfer its heat to the condenser condensate, such second heat exchanger would have to be so large as to economically be impractical.

In accordance with the present invention, the heat of the transformer oil cooling water is economically and efficiently added to the condenser condensate by utilizing a heat pump and a suitable intermediate heat transfer fluid. The system of the invention may also be used to transfer the heat from the hydrogen, used to cool the generators or alternators, to the condensate. With the invention arrangement, the efficiency of heat extraction and recovery is increased to such an extent that the quantities of cooling hydrogen or oil can be reduced, resulting in a decrease in the overall size of the cooled apparatus and an increase in the overall efficiency of the plant.

Figure 2:
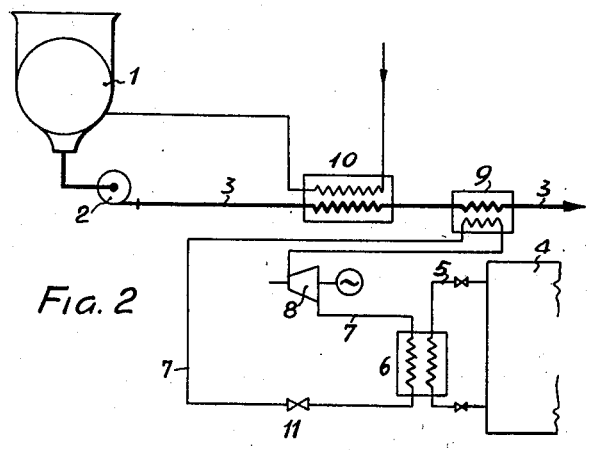

For an understanding of the invention principles, reference is made to the following description of typical embodiments thereof as illustrated in the accompanying drawing. In the drawing:

Fig. 1 is a schematic diagram of one embodiment of heat recovery system according to the invention; and Fig. 2 is a schematic view of an alternative embodiment.

Referring to the drawings, the main condenser, which receives exhaust steam from the turbine (not shown) is illustrated at 1. A pump 2 delivers the condensate from condenser 1 to a line 3 leading to a deaerating heater or degasifier (not shown). The illustrated section of the condensate circuit is at relatively low pressure.

The hot oil from a high capacity transformer 4 flows through a valved line 5 to an evaporating heat exchanger 6 and, after heat is extracted therefrom in the evaporating heat exchanger, it is returned to transformer 4 through a valved return line. Evaporating heat exchanger 6 is connected in the circuit 7 of a heat pump including a compressor 8, an expansion valve 11, and a condensing heat exchanger 9 connected also in the condensate line 3. Compressor 8 may be driven by an electric motor or by means of an auxiliary steam turbine.

Condensing heat exchanger 9 transfers the heat recovered in evaporating heat exchanger 6, from the transformer oil, plus the heat developed in the heat pump, or intermediate fluid, by the compressor 8, to the condensate flowing in line 3.

The compression ratio of compressor 8 is so selected that the condensing heat exchanger 9 may be located at any point in the condensate circuit 3 between extraction pump 2 and the deaerating heater. In the arrangement of Fig. 1, condensing heat exchanger 9 is located in condensate line 3 between pump 2 and heat exchanger 10 which receives steam bled from the last low pressure stage of the turbine. In this case, the condensate entering condensing heat exchanger 9 is at a temperature of 22° C.–24° C. (71.6° F.–74.2° F.), and the heat recovered from the transformer oil increases this temperature.

In the arrangement of Fig. 2, condensing heat exchanger 9 is located in condensate line 3 between heat exchanger 10 and the deaerating heater. The condensate having heat exchanger 10 is at a temperature of 50° C.–55° C. (112° F.–131° F.), and the temperature is increased from these values by the heat recovered from the transformer oil.

In the operation of either system, heat from the transformer oil is transferred, in evaporating heat exchanger 6, to the intermediate fluid. This heat evaporates the intermediate fluid, which is compressed in compressor 8 to attain an optimum temperature level. For good thermal efficiency, the temperature increase must not be too great. In the condensing heat exchanger 9, the intermediate fluid is condensed, transferring its heat content to the condensate. The transferred heat includes that developed as a result of the work done by compressor 8 on the intermediate fluid. The condensed intermediate fluid is then re-expanded through valve 11.

The intermediate fluid should have a relatively low evaporation pressure, at the temperatures involved, so that, in case of leakage in either heat exchanger 6 or 9, contamination of the transformer oil or of the condenser condensate will be avoided. Furthermore, the intermediate fluid should have high values of specific heat and heat vaporization.

Steam meets these criteria, as its evaporation pressures are low at the temperatures involved. Another usable intermediate fluid is one of the special chloro-fluoro-hydrocarbons known generally as "Freons" which have, at the temperatures involved, evaporation pressures slightly lower than atmospheric. A 50% ethyl alcohol is also suitable as the intermediate fluid.

Using the heat pump system of the invention to recover waste heat results in several advantages. The heat exchange is effected by condensation and evaporation, thus providing the best possible conditions for efficiency of heat transfer and with a temperature differential which can be preselected. This results in a low cost for such accessories as evaporating heat exchanger 6 and condensing heat exchanger 9. Also, with an oil circulating pump of the same rating, the cooling oil quantity can be reduced, thus reducing the size and cost of the transformer oil tank.

As the compression ratio of compressor 8 can be preselected, the condensing heat exchanger 9 can be located either before or after heat exchanger 10 in condensate line 3, so that it is not necessary to forego the advantages of regenerative heating of the feed water in order to recover the heat of the transformer oil. It will be appreciated that the same type of heat pump system may be used to recover heat from the hydrogen used to cool the generators or alternators.

While specific embodiments of the invention have been shown and described in detail to illustrate the application of the invention principles, it will be understood that the invention may be embodied otherwise without departing from such principles.

I claim:

1. In a steam power plant having a main condenser receiving exhaust steam from a turbine, a pump for withdrawing condensate from the condenser, a boiler feed water line connected to the outlet of the pump to deliver the condensate to the boiler, and electrical apparatus cooled by a circulating fluid coolant; means for recovering heat from the coolant comprising a heat pump system including an evaporating heat exchanger having the coolant circulated therethrough; a closed circuit in communication with said evaporating heat exxchanger for circulating an intermediate fluid through the latter for evaporation by the heat of the coolant; a compressor in said closed circuit for compressing the evaporated intermediate fluid; and a condensing heat exchanger in said feed water line and in said closed circuit for delivering heat to the condensate by condensation of the compressed evaporated intermediate fluid.

2. Means as claimed in claim 1 in which the electrical apparatus comprises a transformer cooled by circulating oil.

3. Means as claimed in claim 1 in which the electrical apparatus comprises a generator of electricity, cooled by hydrogen.

4. Means as claimed in claim 1 including an expansion valve in said closed circuit upstream of said evaporating heat exchanger.

5. Means as claimed in claim 1 including a regenerative heat exchanger in the feed line for transferring the heat from steam bled from a low pressure turbine stage to the condensate; said condensing heat exchanger being connected in the feed water line upstream of said heat exchanger.

6. Means as claimed in claim 1 including a regenerative heat exchanger in the feed line for transferring the heat from steam bled from a low pressure turbine stage to the condensate; said condensing heat exchanger being connected in the feed water line downstream of said heat exchanger.

References Cited in the file of this patent
UNITED STATES PATENTS

| | | |
|---|---|---|
| 1,302,256 | Weir | Apr. 29, 1919 |
| 2,219,815 | Jones | Oct. 29, 1940 |